US008887511B2

(12) United States Patent
Germain et al.

(10) Patent No.: US 8,887,511 B2
(45) Date of Patent: Nov. 18, 2014

(54) ATTACHEMENT OF A JET ENGINE NACELLE STRUCTURE BY MEANS OF A REINFORCED KNIFE-EDGE/GROOVE COUPLING

(75) Inventors: Etienne Germain, Le Havre (FR); Jean-Yves Elegoët, Bennetot (FR); Patrice Dhainault, Ste Adresse (FR)

(73) Assignee: Aircelle, Gonfreville L'Orcher (FR)

( * ) Notice: Subject to any disclaimer, the term of this patent is extended or adjusted under 35 U.S.C. 154(b) by 1143 days.

(21) Appl. No.: 12/674,087

(22) PCT Filed: May 19, 2008

(86) PCT No.: PCT/FR2008/000691
§ 371 (c)(1),
(2), (4) Date: Feb. 19, 2010

(87) PCT Pub. No.: WO2009/024655
PCT Pub. Date: Feb. 26, 2009

(65) Prior Publication Data
US 2010/0229526 A1  Sep. 16, 2010

(30) Foreign Application Priority Data

Aug. 20, 2007 (FR) ...................................... 07 05891

(51) Int. Cl.
*B64D 29/06* (2006.01)
(52) U.S. Cl.
CPC ..................................... *B64D 29/06* (2013.01)
USPC .................. 60/796; 60/226.2; 244/110 B
(58) Field of Classification Search
CPC ....................................................... B64D 29/06

USPC .......... 60/226.1, 226.2, 226.3, 230, 796–797; 239/265.29; 244/110 B; 137/15.1, 15.2
See application file for complete search history.

(56) References Cited

U.S. PATENT DOCUMENTS

| 4,826,106 A | * | 5/1989 | Anderson | .................. 244/117 R |
| 4,998,409 A | * | 3/1991 | Mutch | ........................... 60/226.2 |
| 5,076,514 A | * | 12/1991 | Melcher | ...................... 244/129.4 |
| 5,239,822 A | * | 8/1993 | Buchacher | ................... 60/226.2 |

(Continued)

FOREIGN PATENT DOCUMENTS

| EP | 0453360 A1 | 10/1991 |
| EP | 0845581 A1 | 6/1998 |
| GB | 2384827 A | 8/2003 |

OTHER PUBLICATIONS

International Search Report PCT/FR2008/000691; Dated Nov. 14, 2008.

*Primary Examiner* — William H Rodriguez
*Assistant Examiner* — Carlos A Rivera
(74) *Attorney, Agent, or Firm* — Brinks Gilson & Lione

(57) ABSTRACT

The present invention relates to a nacelle (1) for a jet engine (4) comprising a forward air inlet section (5), a mid-section (6) intended to surround a jet engine fan, and an aft section (9), at least one portion forming the aft section being connected to the mid-section via an at least partially peripheral radial knife-edge (31) capable of engaging by complementarity of shape with a corresponding groove (32) belonging to a portion (6a) of the mid-section, characterized in that the knife-edge comprises at least one reinforcing segment (35, 36) situated in a region for accommodating high loads, said reinforcing segment being made from a material which is stronger than the remainder of the knife-edge and tailored to the loads which are to be borne by said segment in this region.

11 Claims, 3 Drawing Sheets

(56) References Cited

U.S. PATENT DOCUMENTS

| | | | |
|---|---|---|---|
| 5,581,054 A * | 12/1996 | Anderson et al. | 181/213 |
| 6,340,135 B1 * | 1/2002 | Barton | 244/53 B |
| 6,557,799 B1 * | 5/2003 | Sternberger | 244/110 B |
| 2006/0059889 A1 * | 3/2006 | Cardarella | 60/226.1 |
| 2007/0264128 A1 * | 11/2007 | Grudnoski et al. | 416/244 R |
| 2008/0016844 A1 * | 1/2008 | Shutrump | 60/226.1 |
| 2009/0260344 A1 * | 10/2009 | Hoyland | 60/226.2 |
| 2010/0024435 A1 * | 2/2010 | Vauchel | 60/797 |

* cited by examiner

ATTACHEMENT OF A JET ENGINE NACELLE STRUCTURE BY MEANS OF A REINFORCED KNIFE-EDGE/GROOVE COUPLING

TECHNICAL FIELD

The present invention relates to a nacelle for a jet engine.

BACKGROUND

An airplane is propelled by a number of jet engines each housed in a nacelle.

A nacelle generally has a tubular structure comprising an air intake forward of the jet engine, a middle section intended to surround a fan of the jet engine, a downstream section that may incorporate thrust-reversal means and is intended to surround the combustion chamber of the jet engine, and generally ends in a jet pipe, the outlet of which is situated downstream of the jet engine.

Modern nacelles are intended to house a bypass jet engine capable of generating, on the one hand, a flow of hot air (also known as the primary flow) from the jet engine combustion chamber and, on the other hand, a flow of cold air (the secondary or bypass flow) from the fan and flowing around the outside of the jet engine through an annular passage, also known as a flow path, formed between an inner structure defining a cowling of the jet engine and an inner wall of the nacelle. The two air flows are ejected from the jet engine via the rear of the nacelle.

The parts of the rear section which are kept fixed in flight, namely the inner structure, but also the outer structure of the rear section, are generally connected to the middle section by a clamping system of the knife-edge/groove type.

This type of clamping holds the rear section in place and is able to react longitudinal loads while at the same time permitting radial disengagement to allow the outer and inner structures to be opened easily about a hinge line situated at the 12 o'clock position so that maintenance operations can be carried out on the inside of the nacelle or on the jet engine. These are held closed in flight by latches at the six o'clock position.

Reversers and cowls are generally designed in the form of discrete structural elements, such as longitudinal beams, actuating cylinders, supporting and/or actuating continuous non-structural elements such as acoustic engine cowling panels, moving thrust reverser panels, etc. Such designs lead to the introduction of highly localized loads into certain regions of the groove/knife-edge clamps, particularly those regions situated at the beams and other structural elements.

It has been found that, on the existing structures, these peripheral knife-edge/groove clamps are ill-suited to structures that have very individualized load paths. This results in low tolerance to damage. Further, these clamps are generally made of aluminum and are simply engineered for fatigue strength rather than for damage limitation.

In addition, the clamps on the opening elements are unable to react circumferential (hoop) loads, because they are not axisymmetric.

It is difficult to conceive of making an entire clamp out of a stronger material because this would have a negative impact in terms of the cost and mass of the propulsion unit.

BRIEF SUMMARY

The invention provides a nacelle that has a rear section connected to the middle section by means of a clamp of the knife-edge/groove type that is stronger but does not introduce an excessive burden in terms of the cost and/or mass of the whole.

The invention further provides a nacelle for a jet engine comprising a front air intake section, a middle section intended to surround a jet engine fan and a rear section, at least one constituent part of the rear section being connected to the middle section by an at least partially peripheral radial knife-edge able to collaborate, through complementary shapes, with a corresponding groove exhibited by a part of the middle section, characterized in that the knife-edge comprises at least one reinforcing segment situated in a region that takes high loads, said reinforcing segment being made of a stronger material than the rest of the knife-edge and tailored to the loads that are to be borne by said segment in this region.

Thus, by providing a knife edge that comprises reinforcing segments, only those regions that are subjected to the more intense loads are reinforced.

Producing the knife-edge using reinforcing segments means that the impact both on the mass of the whole of the clamp and on the cost thereof is not excessive, recourse to materials that are stronger, and therefore often heavier and more expensive, being had only at those places where the loads to be borne render such recourse necessary.

Advantageously, the reinforcing segment comprises a plurality of sub-segments. Sub-segmentation such as this is in response to an approach involving segregating load paths and safe breakage. Thus, should one of the sub-segments break as a result of impact, corrosion or through fatigue following the propagation of cracks, the other sub-segments are engineered to withstand the load.

For preference, the knife-edge is based mainly on aluminum. Aluminum meets the requirements of cost and of mass for most of the knife-edge in a nacelle according to the invention.

For preference, the reinforcing segments are made from titanium. Titanium-based alloys have good strength/weight ratios for the application in question.

Advantageously, the reinforcing segment is situated substantially at a join with a longitudinal beam belonging to the structure of the rear section.

Advantageously also, a reinforcing segment is situated substantially at twelve o'clock and a reinforcing segment is situated substantially at six o'clock. This is generally the region of the junction with the pylon or with a beam near the pylon and therefore subjected to high load, and at the region of the junction with the lower longitudinal beam to which the structures of the rear section are locked.

For preference, the nacelle is intended for a bypass jet engine and for this purpose has a rear section comprising an inner structure intended to act as a casing for a rear part of the jet engine and defining with an outer structure a flow path for a cold flow.

According to an alternative form of embodiment, the inner structure is connected to the middle section by the knife-edge coupling.

Alternatively or in addition, the outer structure is connected to the middle section by the knife-edge coupling.

According to a particular embodiment, the rear section comprises thrust-reversal means.

Advantageously, the part of the rear section connected to the middle section by the knife edge coupling is mounted such that it can move so that it can be opened laterally in a direction that allows the knife-edge to disengage from the groove.

For preference, the knife-edge reinforcing segments have at least one end chamfer. Thus, the presence of chamfers redirects any loads applied in a highly localized manner to the reinforcing segment. This results in better load spreading over the entire thickness and/or length of the reinforcing segment.

For preference, the chamfers are situated at a junction between the reinforcing segment or sub-segment and the remainder of the knife-edge or an adjacent sub-segment.

BRIEF DESCRIPTION OF THE DRAWINGS

Other features and advantages of the present invention will become evident from the description which will follow and from studying the attached figures in which.

DETAILED DESCRIPTION

Figure 1:
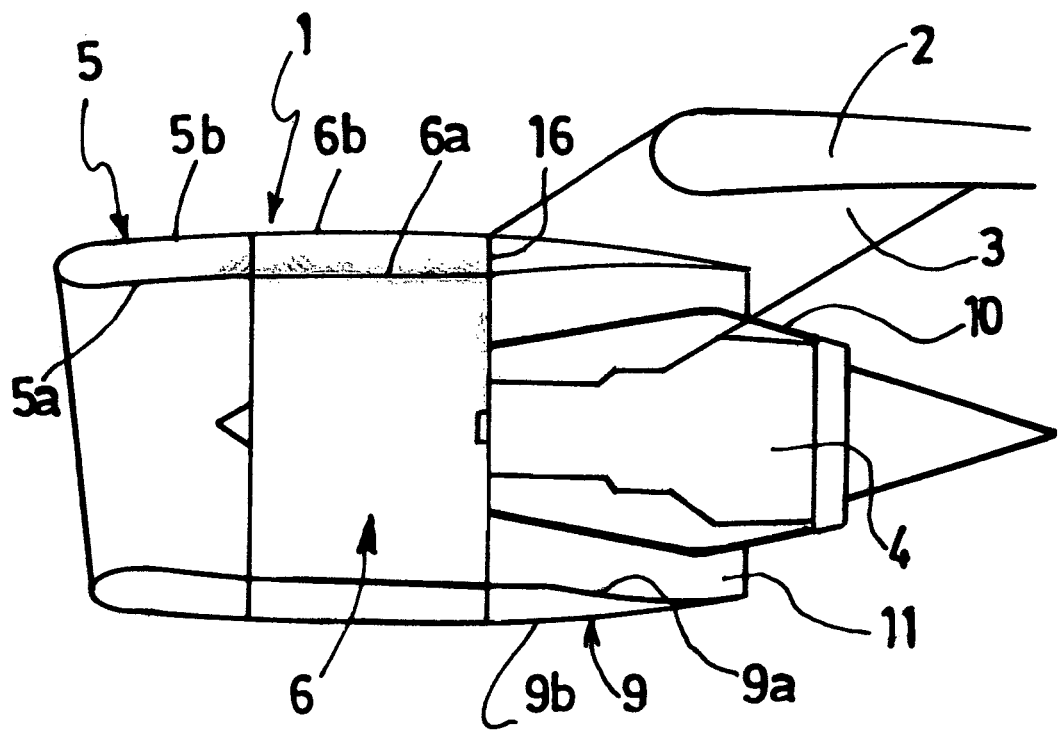
FIG. 1 is a schematic depiction of a bypass jet engine nacelle in longitudinal section.
Figure 2:
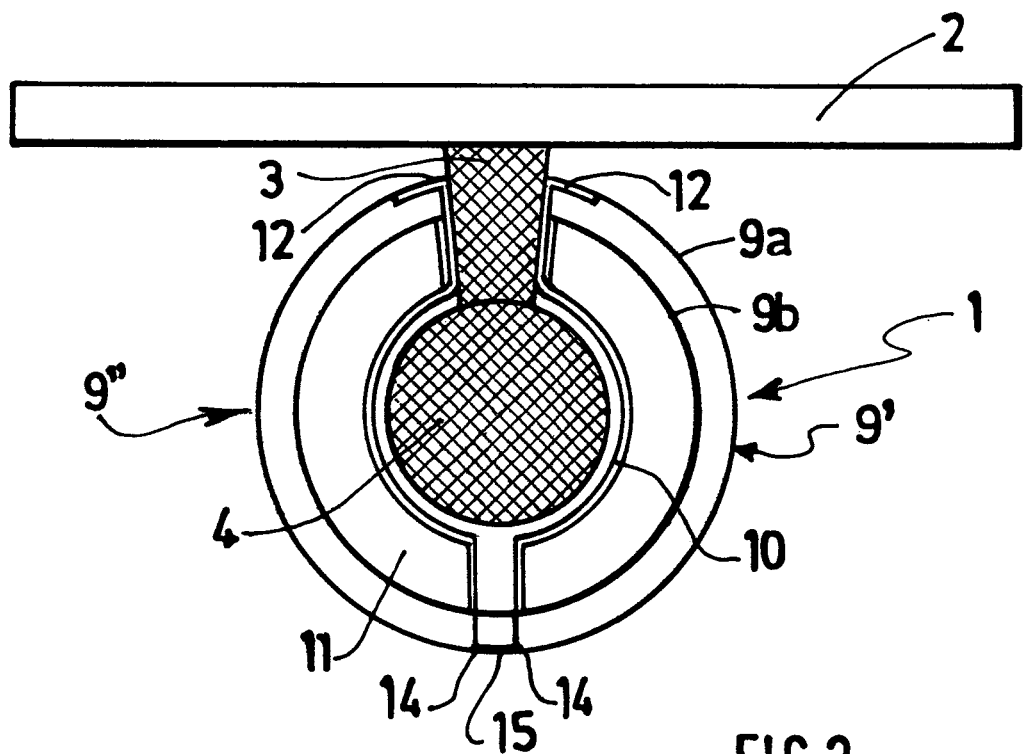
FIG. 2 is a schematic depiction of the nacelle of FIG. 1, in cross section.
Figure 3:
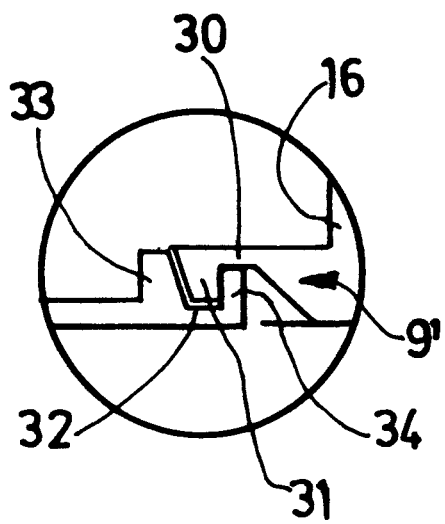
FIGS. 3 and 4 are schematic depictions of a knife-edge/groove system in an engaged position and in a disengaged position, respectively.
Figure 4:
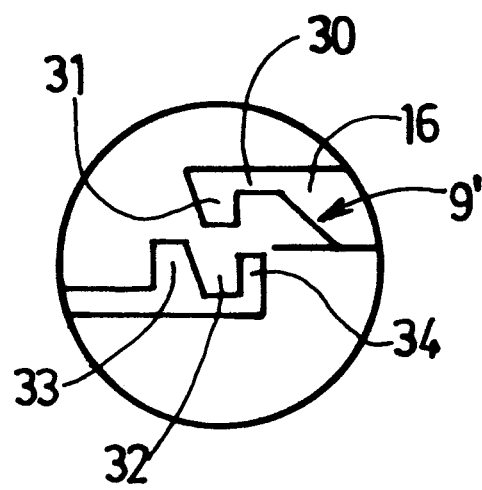

A nacelle 1 according to the invention as depicted in FIGS. 1 and 2 is intended to be attached under a wing 2 of an airplane (not visible) via an oblique pylon 3 directed toward the front of the airplane.

This nacelle 1 constitutes a tubular housing for a jet engine 1 the air flows generated by which it channels. It also houses various components needed for the operation of the jet engine 4.

More specifically, the nacelle 1 has an outer structure comprising a front section forming an air intake 5, a middle section 6 surrounding a fan of the jet engine, and a rear section 9 surrounding the engine and possibly housing a thrust-reversal system (not visible).

The middle section 6 comprises, on the one hand, an inner casing 6a surrounding the fan of the jet engine 4, and, on the other hand, an outer structure 6b for cowling the casing extending an outer surface 5b of the air intake section 5. The casing 6a is attached to the air intake section 5 that it supports and extends an internal surface 5a thereof. The cowling outer structure 6b is generally produced in the form of moving cowls situated on each side of the nacelle 1 with respect to the axis of the pylon 3 and which meet under the nacelle.

The rear section 9 extends the middle section 6 and comprises an outer structure that has an inner surface 9a in the continuation of the casing 6a and an outer surface 9b in the continuation of the cowling outer structure 6b of the middle section 6. It also comprises an engine cowling inner structure 10 defining with the inner surface 9a a flow path 11 for a flow of cold air in the case of a bypass jet engine like the one depicted here.

The rear section 9 is produced in the form of two lateral half-parts 9', 9" situated one on each side of the nacelle 1 and able to open to provide access to the jet engine 4.

Each half-part 9', 9" comprises an upper edge 12 equipped with means (not visible) of attachment to the pylon 3 of the latch type (for lateral opening) or hinge type (for radial opening) and a lower edge 14 equipped with latching means 15 able to lock the two half-parts together.

The whole of the outer structure of the rear section 9 and of the inner structure 10 of each half-part 9', 9" is supported by a front frame 16, itself supported by the casing 6a.

To ensure the mechanical integrity of the whole of the nacelle and the transmission of loads to the pylon 3, the half-parts 9', 9" are, via the front frame 16, equipped with a latching system able to collaborate with complementary latching means secured to the casing 6a of the middle section.

This latching system takes the form of a groove/knife-edge clamp, the knife-edge being borne by the front frame 16 while the peripheral groove is exhibited by the casing 6a.

More specifically, the front frame 16 of each half-part 9', 9" has a longitudinal extension 30 ending in a return forming a knife edge 31 directed radially toward the casing 6a.

This knife-edge 31 is intended to collaborate with a correspondingly shaped radial groove 32 with which the casing 6a is equipped and which has an outer border 34 and an inner border 33.

In general, the groove 32 and the knife-edge 31 each have a complementary V-shaped profile, the groove being commonly known by its English name of "V-groove".

The groove/knife-edge system has the advantage of giving the assembly good mechanical integrity to withstand longitudinal load when engaged while at the same time allowing easy radial disengagement which therefore allows the half-parts 9', 9" to be opened quickly and simply.

According to the prior art, the groove and the knife-edge are made of aluminum in the form of an alloy that represents a good compromise between strength and weight.

However, as explained previously, the highest loads withstood and transmitted by the clamp are localized.

Specifically, the outer structure of the rear section generally comprises a skeleton comprising one or more longitudinal beams and to which an acoustic inner skin and an aerodynamic outer skin are attached.

It therefore follows that the load transmitted to the clamp are logically localized at a junction between the longitudinal beams and the front frame 16. There will generally be at least two main load paths, these being substantially at 12 o'clock at the beams connected to the pylon 3, and at 6 o'clock at a lower longitudinal beam 37 supporting the means that lock the two half-parts 9', 9" together.

It will also be noted that a high load line runs along each actuator with which a thrust-reversal system is equipped.

According to the invention, the knife-edge fitted to the front frame 16 of each half-part is no longer made as a single piece of a single alloy but comprises reinforcing segments made of a material tailored to the loads to be borne at the location of the reinforcing segments.

Figure 5:
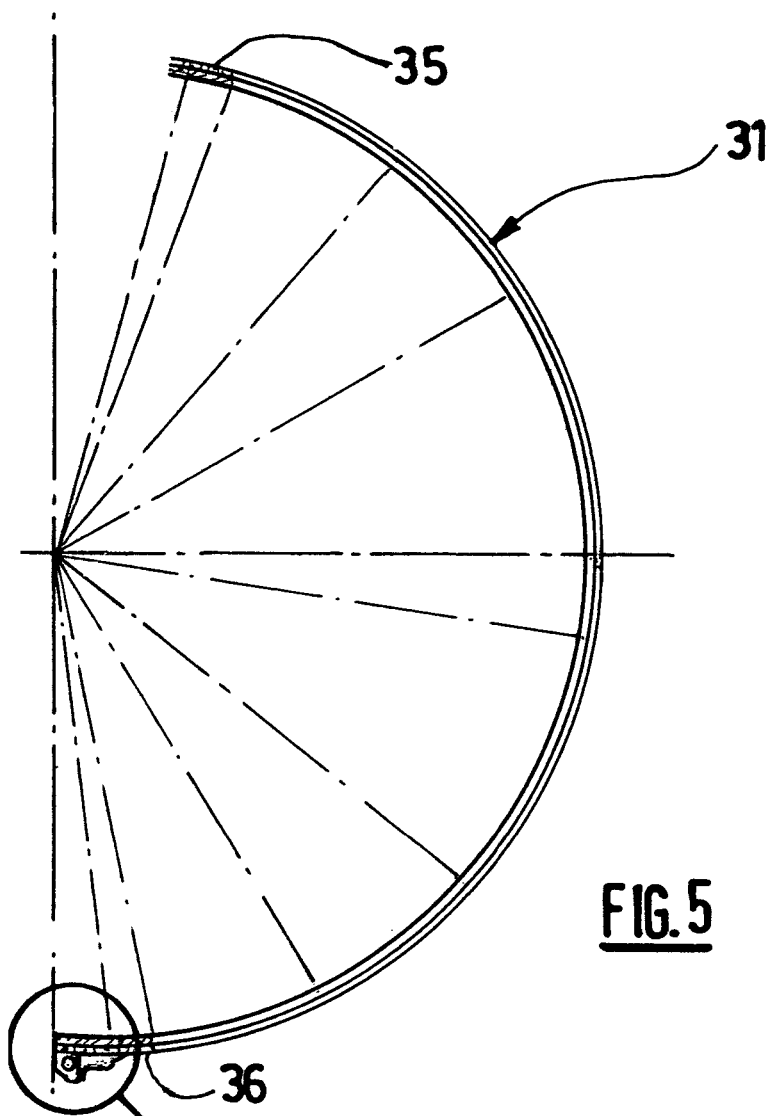
FIG. 5 is a schematic depiction of a knife-edge exhibited by a rear section half-part.

A knife-edge such as this is depicted in FIG. 5. This knife-edge substantially describes a semi-circle, with the exception of an upper region corresponding to the location of the pylon 3. As explained previously, the knife-edge is predominantly made of an aluminum alloy.

However, it does comprise an upper reinforcing segment 35, situated at the upper end of said knife-edge near the pylon 3, and a lower reinforcing segment 36, situated at the lower end in the region of the lower longitudinal latching beam 37.

Each of these reinforcing segments 35, 36 is made of a titanium-based alloy that has better resistance to load, better suited to the loads likely to be transmitted at this point of the front frame 16.

Each reinforcing segment 35, 36 is made up of three sub-segments (not visible) which ensure optimal safety, each sub-segment being engineered to be able to withstand the loads applied at this point in the event of failure of at least one of the other sub-segments. This is an approach that involves segregation of load paths and safe breakage. Furthermore, dividing a reinforcing segment into several sub-segments makes it possible to limit the propagation of any cracks present in one sub-segment as a result of an impact, for example.

Figure 6:
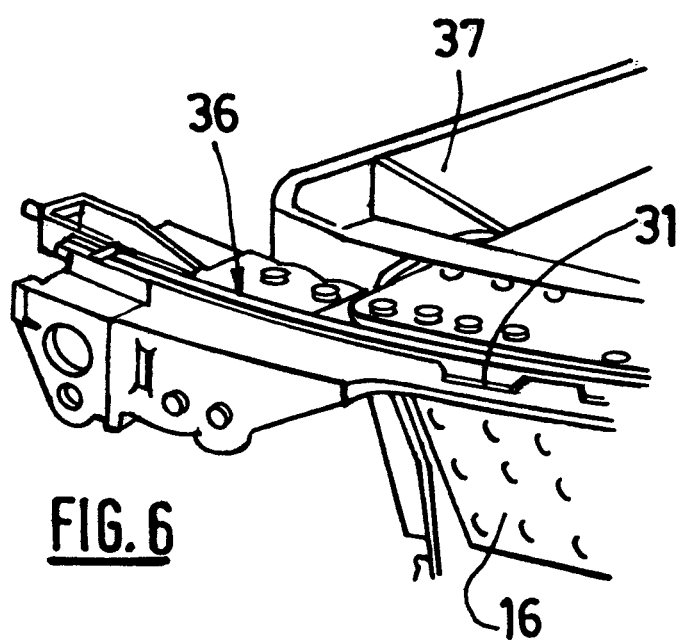
FIG. 6 is an enlarged depiction of a lower part of the knife-edge depicted in FIG. 5.

FIG. 6 shows an enlarged view of the lower reinforcing segment 36. It will therefore be noted that the reinforcing segment 36 has a chamfered profile.

This is because, with the same intention of better spreading the longitudinal loads applied to the knife-edge 31, it has been found that creating a chamfer cuts out load spikes applied locally to the reinforcing segment and better spreads the loads over the entire thickness of the knife-edge and over the entire length of the reinforcing segments. Chamfers may also be created between each sub-segment so as to avoid any load spikes where two sub-segments meet or at the junction between sub-segments and the remainder of the knife-edge, and to carry the load toward the center of the reinforcing sub-segment or segment.

Although the invention has been described in conjunction with specific exemplary embodiments, it is quite obvious that it is not in any way restricted thereto and that it encompasses all technical equivalents of the means described and combinations thereof where these fall within the scope of the invention.

In particular, it may be noted that the present invention has been described for a groove/knife-edge system between the outer structure 9a, 9b and the fan casing 6a. It is quite obviously possible to apply the same type of knife-edge/groove coupling alternatively, or in addition, to the inner structure 10 or to the attachment of a cold flow jet pipe in the case of a long nacelle in a mechanical coupling with a jet engine casing situated in the region of the fan. These couplings are separate couplings commonly known by their English names of "inner V-groove" and "outer V-groove".

The invention claimed is:

1. A nacelle for a jet engine comprising:
   a front air intake section,
   a middle section intended to surround a jet engine fan and
   a rear section, at least one constituent part of the rear section being connected to the middle section by an at least partially peripheral radial knife-edge collaborating, through complementary shapes, with a corresponding groove exhibited by a part of the middle section,
   wherein the knife-edge comprises a v-blade and at least one reinforcing segment located at discrete places along a circumferential periphery of the v-blade, said reinforcing segment situated in a region that takes high loads, said reinforcing segment being made of a different and stronger material than a remainder of the knife-edge and tailored to loads that are to be borne by said reinforcing segment in this region.

2. The nacelle for a jet engine as claimed in claim 1, wherein the knife-edge is based mainly on aluminum.

3. The nacelle for a jet engine as claimed in claim 1, wherein the reinforcing segments are made from titanium.

4. The nacelle for a jet engine as claimed in claim 1, wherein the reinforcing segment is situated substantially at a join with a longitudinal beam belonging to a structure of the rear section.

5. The nacelle as claimed in claim 1, wherein said at least one reinforcing segment comprises a reinforcing segment situated substantially at twelve o'clock and a reinforcing segment situated substantially at six o'clock.

6. The nacelle as claimed in claim 1, wherein a bypass jet engine and for this purpose has a rear section comprising an inner structure to act as a casing for a rear part of the jet engine and defining with an outer structure a flow path for a cold flow.

7. The nacelle as claimed in claim 6, wherein the inner structure is connected to the middle section by the knife-edge coupling.

8. The nacelle as claimed in claim 6, wherein the outer structure is connected to the middle section by the knife-edge coupling.

9. The nacelle as claimed in claim 1, wherein the rear section comprises thrust-reversal means.

10. The nacelle as claimed in claim 1, wherein the part of the rear section connected to the middle section by the knife edge coupling is mounted such that said part can move so that said part can be opened laterally in a direction that allows the knife-edge to disengage from the groove.

11. A nacelle for a jet engine comprising:
    a front air intake section;
    a middle section intended to surround a jet engine fan; and
    a rear section, comprising a radial front frame having a longitudinal extension forming, along a periphery of the radial front frame, a knife edge collaborating with a corresponding groove exhibited by a part of the middle section,
    wherein the knife-edge comprises a v-blade and at least one reinforcing segment located at discrete places along a circumferential periphery of the v-blade, said reinforcing segment situated in a region that takes high loads, said reinforcing segment being made of a different and stronger material than a remainder of the knife-edge and tailored to loads that are to be borne by said reinforcing segment in this region.

* * * * *